United States Patent Office 3,208,997
Patented Sept. 28, 1965

3,208,997
PROCESS FOR PREPARING PURINE AND
PYRIMIDINE NUCLEOSIDES
Issei Iwai and Takuzo Nishimura, Shinagawa-ku, Tokyo, Japan, assignors to Sankyo Company, Limited, Tokyo, Japan
No Drawing. Filed Nov. 8, 1963, Ser. No. 322,500
Claims priority, application Japan, Nov. 15, 1962, 37/50,003
3 Claims. (Cl. 260—211.5)

This invention relates to a process for preparing purine and pyrimidine nucleosides.

More particularly, it relates to an improved process for the preparation of nucleosides having purine or pyrimidine ring as the base moiety and a radical derived from pentose or hexose as the saccharide moiety.

The purine and pyrimidine nucleosides obtained by the process according to the present invention have the general formulae

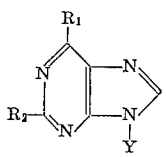

(I)

and

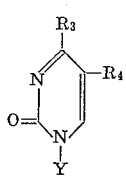

(II)

wherein each of $R_1$ and $R_2$ is selected from the group consisting of hydrogen, hydroxy, mercapto, amino and acylamino, each of $R_3$ and $R_4$ is selected from the group consisting of hydrogen, hydroxy, amino, acylamino, mercapto and methyl and Y is a glycosyl radical. The term "glycosyl" as used herein means glycosyl derived from aldopentose and aldohexose such as D-, L- and DL-ribosyl, D-, L- and DL-xylosyl, D-, L- and DL-arabinosyl, D-, L- and DL-lyxosyl, D-, L- and DL-glucosyl, D- L- and DL-mannosyl and D-, L- and DL-galactosyl.

With recent development of biochemical studies a great deal of new findings have been established with respect to purine and pyrimidine nucleosides. Biochemical significance has been elucidated of purine and pyrimidine nucleosides, and a wide variety of their applications developed, for example, in the use as anti-cancer agents on the basis of their antimetabolic activities or as food seasonings utilizing inosinic or guanilic acid.

Various methods have been developed for the preparation of purine and pyrimidine nucleosides as described above, but all the known methods are subject to considerable limitations and disadvantages.

One method consists in the reaction of a silver salt of purines such as silver salt of adenine with acetylglycosyl halide, for example, as described by E. Fischer and B. Helfelich, in Chemische Berichte 47, 210 (1914). In this method, the yields are usually poor and the procedure is complicated. Another method is to react a chloromercury salt of purines such as chloromercury salt of 6-benzamidopurine with acetylglycosyl halide, for example, as described by J. Davoll et al., in J. Am. Chem. Soc. 73, 1650 (1951) and 73, 3174 (1951). This method has a similar disadvantage as described above. Another process is that of G. Hilbert et al., in J. Biol. Chem. 117, 371 (1937) and Todd et al., in J. Chem. Soc. 1052 (1947), being consisted of the condensation of a 2,4-dialkoxypyrimidine with an acetylglycosyl halide. However, this process is disadvantageous from the industrial point of view, because, for example, it requires a long period of time for effecting the condensation reaction. Further, another method consists of the reaction of an N-acetylcytosinemercury with an acylglycosyl halide, for example, as described by J. J. Fox et al., in J. Am. Chem. Soc. 79, 5060 (1957). This method is disadvantageous because a large amount of the acylglycosyl halide is used.

It is an object of this invention to provide a process capable of easily producing purine and pyrimidine nucleosides having the above-mentioned Formulae I and II in a high yield without the above-described disadvantages accompanied by the production according to the known processes.

As a result of studies made in order to discover commercially useful process for the preparation of purine and pyrimidine nucleosides without the disadvantages set forth above, it has been found that purine or pyrimidine nucleosides having the above-mentioned Formula I or II may be prepared easily and in a high yield by reacting purine derivatives having the general formula

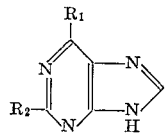

(III)

wherein $R_1$ and $R_2$ have the same meanings as described above or pyrimidine derivatives having the general formula

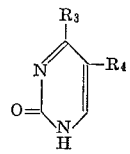

(IV)

wherein $R_3$ and $R_4$ have the same meanings as described above with a tri-lower alkyl-chlorosilane in the presence of a tertiary amine or with a hexa-lower alkyl-disilazane, reacting the resulting product with an acyl-halogeno-pentose or an acyl-halogeno-hexose and removing the acyl group from the product thus obtained.

In carrying out the process according to the present invention, when the compounds of the above-mentioned Formula III or IV have amino group, the first step preferably involves protection of the amino group with an acyl group beforehand conducted.

The first step in the process according to the present invention is carried out by reacting a compound having the Formula III or IV with a tri-lower alkyl-chlorosilane in an anhydrous organic solvent in the presence of a tertiary amine or reacting a compound having the Formula III or IV with a hexa-lower alkyl-disilazane under anhydrous conditions. In carrying out the first step in the process, the reaction should be effected under anhydrous conditions regardless of variation of the reactants used. When the tri-lower alkyl-chlorosilane is to be used as the reactant, examples of the suitable organic solvents are anhydrous inert organic solvents such as benzene, toluene, xylene, dioxane and the like and examples of the tertiary amines are tri-lower alkyl amines such as trimethylamine, triethylamine, tripropylamine and the like and pyridine. The reaction temperature may be varied over a considerable range, say from room temperature upwards to elevated temperature, although preferably room temperature is employed. When the hexa-lower alkyl-disilazane is to be used, the reaction may be effected by suspending the compound having the Formula III or IV in a hexa-lower alkyl-disilazane and heating under reflux the mixture thus obtained.

After completion of the reaction, the reaction product may be isolated from the reaction mixture by one of the conventional methods. For example, after completion of the reaction, the reaction mixture is filtered, the solvent is distilled off from the filtrate, followed by distillation of the resulting residue.

The product obtained as described above may be employed, as such or after the purification of the product, in the next step.

In carrying out the second step in the process, the acyl-halogeno-pentose or acyl-halogeno-hexose may be prepared by protecting the hydroxy groups with an acyl group by one of the conventional methods followed by halogenation with hydrogen halides.

The reaction of the second step is carried out by fusing the reaction product obtained in the first step with an acyl-halogeno-pentose or an acyl-halogeno-hexose. The temperature at which the reaction is conducted is preferably from about 160° C. to about 190° C., but this may be raised or lowered, if deired. The reaction of the second step can also be carried out in an inert atmosphere such as nitrogen.

Alternatively, the reaction of the second step may also be effected by reacting the product prepared by the process according to the first step with the acyl-halogeno-pentose or acyl-halogeno-hexose in a non-polar solvent such as toluene or xylene in the presence of silver cyanate or sodium iodide.

After completion of the reaction, the reaction product may be recovered by one of the conventional methods. For example, when the reaction is carried out by using fusing procedures, after completion of the reaction, the reaction mixture is cooled, treated with aqueous ethanol and dissolved in an organic solvent such as chloroform. The organic solution is washed with water and subjected to chromatography using silica gel column to obtain the desired product.

In carrying out the third step in the process, the hydrolyzing step, the product is subjected to hydrolysis to remove the acyl group attached to the hydroxy group of the glycosyl moiety and, if present, the acyl group attached to the amino group of the purine or pyrimidine moiety. The hydrolysis may be effected by one of the conventional methods. For example, this hydrolyzing step can be effected by treating the compound to be treated with a sodium alkoxide such as sodium methoxide in an alcohol such as methanol, ethanol or propanol, by treating the compound to be treated with ammonia in an alcohol such as methanol or by treating the compound to be treated with a mineral acid such as hydrochloric acid.

The following examples are given for the purpose of illustrating the present invention, but are not intended to be limiting on the scope thereof.

EXAMPLE 1

*Preparation of 9-β-D-glucopyranosylhypoxanthine*

A suspension of 9.45 g. of hypoxanthine in 23 g. of hexamethylbisilazane is heated under reflux on an oil bath with occasional shaking for about 12 hours. After completion of the reaction, the reaction mixture is distilled to give 15.5 g. of bis-trimethylsilylhypoxanthine boiling at 150–153° C./2 mm. Hg. In a round-bottomed flask equipped with a reflux condenser is placed 1.4 g. of bis-trimethylsilylhypoxanthine obtained as described above and 2.05 g. of α-acetobromoglucose and the resulting mixture is fused at 160–165° C. on an oil bath for about 15 minutes under dry nitrogen stream.

After completion of the reaction, the reaction mixture is cooled and dissolved in 30 ml. of chloroform and the chloroform solution is washed twice, with 15 ml. of aqueous sodium bicarbonate solution dried and then the chloroform is distilled off. The resulting residue is subjected to chromatography using a silica gel (about 150 g.) column and chloroform-acetone followed by recrystallization from ethanol to give 0.4 g. of 1-(2′,3′,4′-tetraacetyl-β-D-glucopyranosyl)-hypoxanthine melting at 258–262° C. 0.15 g. of 1-(2′,3′,4′-tetraacetyl-β-D-glucopyranosyl)-hypoxanthine obtained as described above is dissolved in 50 ml. of methanol and 0.1 g. of sodium methoxide is added to the solution and then the resulting mixture is heated under reflux for about 20 minutes.

The reaction mixture is cooled and treated with a small amount of water and Dowex-50 (the ion-exchange resin prepared and sold by The Dow Chemical Co., in H+ form to remove sodium ion, the solvent is distilled off and the residue is recrystallized from ethanol to give 0.08 g. of 9-β-D-glucopyranosylhypoxanthine, M.P. 259–260° C.

EXAMPLE 2

*Preparation of 1-β-D-glucopyranosyluracil*

To a suspension of 11.2 g. of uracil in 150 ml. of dry dioxane is added 21 g. of trimethylchlorosilane and a solution of 19.5 g. of triethylamine in 30 ml. of dry dioxane is added dropwise to the resulting mixture with stirring. The reaction is carried out at room temperature for several hours. After completion of the reaction, the reaction mixture is filtered to separate the crystalline material. The separated crystalline material is washed with dioxane, the washings and the filtrate are combined and then concentrated.

The concentrated residue is distilled to give 15.7 g. of bis-trimethylsilyluracil boiling at 116° C./12 mm. Hg.

In a round-bottomed flask equipped with a reflux condenser is placed 1.28 g. of bis-trimethylsilylauracil, the contents are heated at 185° C. and then 2.05 g. of α-acetobromoglucose are added portionwise over about 20 minutes under dry nitrogen stream.

The reaction mixture is kept at 185° C. for about 15 minutes. After completion of the reaction, the reaction mixture is cooled, dissolved in hot aqueous ethanol, the solvent is removed under reduced pressure and the residue is dissolved in 50 ml. of chloroform. The chloroform layer is washed successively with aqueous solution of sodium bicarbonate and water, dried over magnesium sulfate and the chloroform is distilled off.

The residue is shaken with ether to remove ether-soluble materials, ethanol is added to the residue and the resulting solution is cooled with ice.

The resulting crude crystalline material is recrystallized from ethanol to give 0.7 g. of 1-(2′,3′,4′,6′-tetraacetyl-β-D-glucopyranozyl)-uracil having the following properties: M.P. 153–155° C. and $[\alpha]_D^{28}$ −9.3° (in chloroform).

0.5 g. of 1-(2′,3′,4′,6′-tetraacetyl-β-D-glucopyranosyl)-uracil obtained as described above is deacetylated with sodium methodixe in absolute methanol in a conventional manner, treated with Dowex-50 in H+ form, the solvent is removed and the residue is recrystallized from aqueous ethanol to give 0.3 g. of 1-β-D-glucopyranosyluracil·½ hydrate having the following properties: M.P. 206–207° C. and $[\alpha]_D^{28}$ +21.9° (in water).

The melting point and specific rotation indicated above are identical with those of the authentic samples.

EXAMPLE 3

*Preparation of 1-β-D-glucopyranosylthymine*

To a suspension of 12.6 g. of thymine in 100 ml. of dry benzene is added 21.7 g. of trimethylchlorosilane and then a solution of 20.2 g. of triethylamine in 50 ml. of dry benzene is added dropwise to the mixture with stirring. The resulting mixture is stirred for several hours to complete reaction. After completion of the reaction, the reaction mixture is filtered to remove crystalline materials, the crystalline materials are washed several times with 50 ml. portions of benzene, and the washings and the filtrate are combined and concentrated. The conentrate is distilled under reduced pressure to give 22.2 g. of bis-trimethylsilylthymine boiling at 121–123° C./12 mm. Hg.

Following the procedure described in Example 2 using 1.4 g. of bis-trimethylsilylthymine and 2.0 g. of α-acetobromoglucose, there is produced 0.9 g. of 1-(2',3',4',6'-tetraacetyl-β-D-glucopyranosyl)-thymine melting at 155–156° C., $[\alpha]_D^{27}$ —10.4° (in water).

Following the procedure described in Example 2 using 0.5 g. of 1-(2',3',4',6,-tetraacetyl-β-D-glucopyranosyl)-thymine, there is produced 0.26 g. of 1-β-D-glucopyranosylthymine having the following properties: M.P. 269–271° C. and $[\alpha]_D^{27}$ +18° (in water).

EXAMPLE 4

Preparation of 1-β-D-glucopyranosylcytosine

To a suspension of 15.3 g. of N-acetylcytosine in about 350 ml. of dry benzene is added, 23.9 g. of trimethylchlorosilane and a solution of 22.2 g. of triethylamine in benzene is added dropwise to the mixture with stirring.

Thereafter, the product is worked up in a manner similar to that described in Example 3 to give 18.1 g. of bis-trimethylsilyl-N-acetylcytosine boiling at 139–141° C./6 mm. Hg.

Following the procedure in Example 2 using 3.3 g. of bis-trimethylsilyl-N-acetylcytosine obtained as described above and 4.1 g. of -acetobromoglucose, there is produced 0.7 g. of 1-(2',3',4',6'-tetraacetyl-β-D-glucopyranosyl)-N-acetylcytosine melting at 222–226° C.

A solution of 0.65 g. of 1-(2',3',4',6'-tetraacetyl-β-D-glucopyranosyl)-N-acetylcytosine obtained as described above dissolved in 30 ml. of absolute methanol is saturated with dry ammonia at 0° C., allowed to stand overnight, the solvent is removed and then the residue is treated with picirc acid in methaol to give 0.3 g. of 1-β-D-glucopyranosylcytosine picrate, M.P. 209–210° C.

EXAMPLE 5

Preparation of 9-β-D-glucopyranosyladenine

Following the procedure in Example 3 using 24 g. of $N^6$-benzoyladenine, 21.7 g. of trimethylchlorosilane and 20.2 g. of triethylamine, there is produced 25.3 g. of bis-trimethylsilyl-$N^6$-benzoyladenine boiling at 177–183° C./ 8×10⁻⁴ mm. Hg, and there is recovered 3.17 g. of N-benzoyladenine.

5.5 g. of bis-trimethylsilyl-$N^6$-benzoyladenine obtained as described above is condensed with 4.2 g. of α-acetobromoglucose in the same manner as in Example 4 and the resulting product is deacetylated with methanolic ammonia according to the procedure as described in Example 4 and the deacetylated product is treated with Dowex-50 in H⁺ form to remove the unreacted sugar. The product is recrystallized from methanol to give 0.31 g. of 9-β-D-glucopyranosyladenine having the following properties: M.P. 201–203° C. and $[\alpha]_D^{28}$ —8.5° (in water).

EXAMPLE 6

Preparation of 1-β-D-ribofuranosyluracil 1.6 of bis-trimethylsilyluracil prepared as in Example 2 is reacted with 2,3,5-tribenzoylribofuranosyl chloride prepared by treating 3.0 g. of 1-acetyl-2,3,5-tribenzoylribose with hydrochloric acid-ether and the resulting product is chromatographed by using a silica gel column and chloroform followed by recrystallization from ethanol to give 0.9 g. of 1-(2',3',5'-tribenzoyl-β-D-ribofuranosyl)-uracil having the following properties; M.P. 145–146° C. and $[\alpha]_D^{29}$ —48° (in chloroform). 0.56 g. of the product obtained as described above is debenzoylated in a conventional manner by using absolute methanol and sodium methoxide followed by recrystallization from ethanol to give 0.21 g. of 1-β-D-ribofuranosyluracil having the following properties: M.P. 165–166° C. and $[\alpha]_D^{30}$ +4.6° (in water).

EXAMPLE 7

Preparation of 1-β-D-ribofuranosylthymine 1.95 g. of bis-trimethylsilylthymine prepared as in Example 3 is reacted with 2,3,5-tribenzoylribofuranosyl chloride prepared from 3.0 g. of 2,3,5-tribenzoylribose as in Example 6 according to the procedure described in Example 3 to give 1.8 g. of 1-(2',3',5'-tribenzoyl-β-D-ribofuranosyl)-thymine.

The resulting product is debenzoylated in a conventional manner by using absolute methanol and sodium methoxide to give 0.5 g. of 1-β-D-ribofuranosylthymine having the following properties: M.P. 183–185° C. and $[\alpha]_D^{27}$ —10.0° (in water).

EXAMPLE 8

Preparation of 9-(2',3',5'-triacetyl-β-D-ribofuranosyl)-hypoxanthine(triacetylinosine)

2.0 g. of bis-trimethylsilylhypoxanthine prepared in Example 1 is reacted with 2,3,5-tribenzoylribofuranosyl chloride prepared from 3 g. of 1-acetyl-2,3,5-tribenzoylribose in the same manner as in Example 6, according to the procedure described in Example 1. After the reaction is completed, the resulting product is directly debenzoylated with absolute methanol-sodium methoxide, the debenzoylated product is acetylated with acetic anhydride-pyridine and the product thus obtained is recrystallized from ethanol to give 0.18 g. of 9-(2',3',5'-triacetyl-β-D-ribofuranosyl-hypoxanthine melting at 238–240° C.

We claim:

1. A process for preparing a compound selected from the group consisting of compounds having the formulae

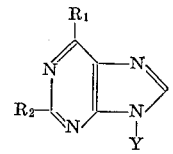

and

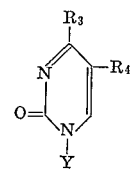

wherein each of $R_1$ and $R_2$ is selected from the group consisting of hydrogen, hydroxy, mercapto, amino and acylamino, in which acyl is selected from the group consisting of aliphatic acyl of 1–3 carbon atoms on the alkyl moiety and benzoyl, each of $R_3$ and $R_4$ is selected from the group consisting of hydrogen, hydroxy, amino, acylamino, in which acyl has the same meanings as described above, mercapto and methyl and Y is a glycosyl radical which comprises reacting a compound selected from the group consisting of compounds having the formulae

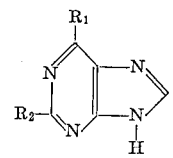

and

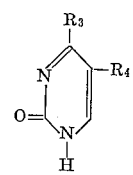

wherein $R_1$, $R_2$, $R_3$ and $R_4$ have the same meanings as described above with a compound selected from the group of compounds consisting of tri-lower alkyl-chlorosilanes and hexa-lower alkyl-disilazanes under anhydrous conditions, heating the resulting product with a compound selected from the group of compounds consisting of acyl-halogeno-pentoses and acyl-halogeno-hexoses, in which yl has the same meaning as described above and halogeno is selected from the group consisting of chloro and bromo, until fusion takes place and removing the acyl group from the product thus obtained.

2. A process for preparing a compound selected from the group consisting of compounds having the formulae

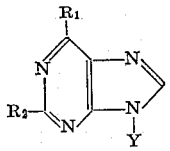

and

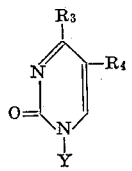

wherein each of $R_1$ and $R_2$ is selected from the group consisting of hydrogen, hydroxy, mercapto, amino and acylamino, in which acyl is selected from the group consisting of aliphatic acyl of 1–3 carbon atoms on the alkyl moiety and benzoyl, each of $R_3$ and $R_4$ is selected from the group consisting of hydrogen, hydroxy, amino, acylamino, in which acyl has the same meaning as described above and halogeno is selected from the group consisting of chloro and bromo, mercapto and methyl and Y is a glycosyl radical which comprises reacting a compound selected from the group consisting of compounds having the formulae

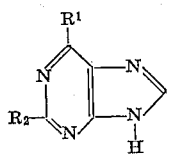

and

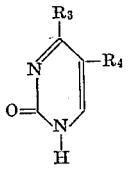

wherein $R_1$, $R_2$, $R_3$ and $R_4$ have the same meanings as described above with a tri-lower alkyl-chlorosilane in an anhydrous inert organic solvent in the presence of a tertiary amine, heating the product with a compound selected from the group of compounds consisting of acyl-halogeno-pentoses and acyl-halogeno-hexoses, in which acyl has the same meaning as described above and halogeno is selected from the group consisting of chloro and bromo, until fusion takes place and removing the acyl group from the product thus obtained.

3. A process for preparing a compound selected from the group consisting of compounds having the formulae

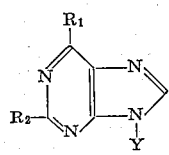

and

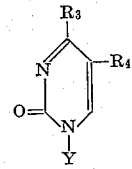

wherein each of $R_1$ and $R_2$ is selected from the group consisting of hydrogen, hydroxy, mercapto, amino and acylamino in which acyl is selected from the group consisting of aliphatic acyl of 1–3 carbon atoms on the alkyl moiety and benzoyl, each of $R_3$ and $R_4$ is selected from the group consisting of hydrogen, hydroxy, amino, acylamino, in which acyl has the same meanings as described above, mercapto and methyl and Y is a glycosyl radical which comprises reacting a compound selected from the group consisting of compounds having the formulae

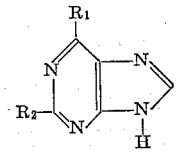

and

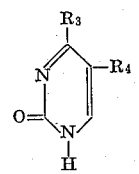

wherein $R_1$, $R_2$, $R_3$ and $R_4$ have the same meanings as described above with a hexa-lower alkyl-disilazane under anhydrous conditions, heating the product with a compound selected from the group consisting of compounds of acyl-halogeno-pentoses and acyl-halogeno-hexoses, in which acyl has the same meaning as described above and halogeno is selected from the group consisting of chloro and bromo, until fusion takes place and removing the acyl group from the product thus obtained.

References Cited by the Examiner

UNITED STATES PATENTS 2,719,843 10/55 Davoll et al. _____ 260—211.5
2,906,756 9/59 De Benneville et al. ____ 260—251

LEWIS GOTTS, *Primary Examiner.*